US010450661B2

(12) United States Patent
DiMascio et al.

(10) Patent No.: US 10,450,661 B2
(45) Date of Patent: Oct. 22, 2019

(54) ELECTROCHEMICAL MODULE CONFIGURATION FOR THE CONTINUOUS ACIDIFICATION OF ALKALINE WATER SOURCES AND RECOVERY OF $CO_2$ WITH CONTINUOUS HYDROGEN GAS PRODUCTION

(71) Applicant: The Government of the United States of America, as represented by the Secretary of the Navy, Washington, DC (US)

(72) Inventors: Felice DiMascio, Rock Hill, CT (US); Heather D. Willauer, Fairfax Station, VA (US); Dennis R. Hardy, California, MD (US); Frederick Williams, Accokeek, MD (US); M. Kathleen Lewis, Lake Ariel, PA (US)

(73) Assignee: The Government of the United States of America, as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 15/614,855

(22) Filed: Jun. 6, 2017

(65) Prior Publication Data
US 2017/0268116 A1      Sep. 21, 2017

Related U.S. Application Data

(62) Division of application No. 14/193,281, filed on Feb. 28, 2014, now Pat. No. 9,719,178.
(Continued)

(51) Int. Cl.
*C25B 1/10*    (2006.01)
*C25B 1/00*    (2006.01)
(Continued)

(52) U.S. Cl.
CPC ............... *C25B 1/10* (2013.01); *C01B 32/50* (2017.08); *C25B 1/00* (2013.01); *C25B 9/10* (2013.01);
(Continued)

(58) Field of Classification Search
None
See application file for complete search history.

(56) References Cited

U.S. PATENT DOCUMENTS

| 4,212,714 A | * | 7/1980 | Coker | ........................ | C25B 1/46 |
| | | | | | 204/263 |
| 4,247,376 A | * | 1/1981 | Dempsey | .................. | C25B 1/26 |
| | | | | | 204/258 |

(Continued)

*Primary Examiner* — Salil Jain
(74) *Attorney, Agent, or Firm* — US Naval Research Laboratory; Rebecca L. Forman

(57) ABSTRACT

A method for using an electrochemical cell to continuously acidify alkaline water sources and recover carbon dioxide with simultaneous continuous hydrogen gas production. The electrochemical cell has a center compartment, an electrolyte-free anode compartment having a mesh anode in direct contact with an ion permeable membrane, an endblock in direct contact with the anode where the endblock provides a gas escape route behind the anode, an electrolyte-free cathode compartment having a mesh cathode in direct contact with an ion permeable membrane, and an endblock in direct contact with the cathode where the endblock provides a gas escape route behind the cathode. Current applied to the electrochemical cell for generating hydrogen gas also lowers the pH of the alkaline water to produce carbon dioxide with no additional current or power.

17 Claims, 2 Drawing Sheets

Related U.S. Application Data

(60) Provisional application No. 61/770,653, filed on Feb. 28, 2013.

(51) Int. Cl.
*C25B 9/10* (2006.01)
*C01B 32/50* (2017.01)
*C02F 1/461* (2006.01)

(52) U.S. Cl.
CPC .............. *C02F 2001/46185* (2013.01); *C02F 2201/46115* (2013.01); *Y02E 60/366* (2013.01)

(56) References Cited

U.S. PATENT DOCUMENTS

| | | | | |
|---|---|---|---|---|
| 4,457,815 A | * | 7/1984 | Levin | C08J 5/2281 |
| | | | | 204/252 |
| 4,457,822 A | * | 7/1984 | Asano | C25B 9/10 |
| | | | | 204/252 |
| 4,666,574 A | * | 5/1987 | Oda | C25B 1/46 |
| | | | | 204/263 |
| 2011/0281959 A1 | * | 11/2011 | DiMascio | C10G 2/50 |
| | | | | 518/704 |

* cited by examiner

ELECTROCHEMICAL MODULE CONFIGURATION FOR THE CONTINUOUS ACIDIFICATION OF ALKALINE WATER SOURCES AND RECOVERY OF CO₂ WITH CONTINUOUS HYDROGEN GAS PRODUCTION

PRIORITY CLAIM

This Application is a divisional application that claims priority from U.S. application Ser. No. 14/193,281 filed on Feb. 28, 2014 by Felice DiMascio et al, entitled "ELECTROCHEMICAL MODULE CONFIGURATION FOR THE CONTINUOUS ACIDIFICATION OF ALKALINE WATER SOURCES AND RECOVERY OF CO₂ WITH CONTINUOUS HYDROGEN GAS PRODUCTION," which claimed priority from U.S. Provisional Application No. 61/770,653 filed on Feb. 28, 2013 by Felice DiMascio et al., entitled "AN ELECTROCHEMICAL MODULE CONFIGURATION FOR THE CONTINUOUS ACIDIFICATION OF ALKALINE WATER SOURCES AND RECOVERY OF CO₂ WITH CONTINUOUS HYDROGEN GAS PRODUCTION." The entire contents of the provisional and parent applications and all references cited throughout this application and the provisional application are incorporated herein by reference.

BACKGROUND OF THE INVENTION

Field of the Invention

The present invention relates generally to recovery of carbon from alkaline water sources and, more specifically, to recovering carbon while simultaneously producing hydrogen gas.

Description of the Prior Art

The total carbon content of the world's oceans is roughly 38,000 GtC. Over 95% of this carbon is in the form of dissolved bicarbonate ion ($HCO_3^-$). Cline *The Economics of Global Warming*; Institute for International Economics: Washington D.C. (1992). This ion along with carbonate is responsible for buffering and maintaining the ocean's pH which is relatively constant below the first 100 meters. This dissolved bicarbonate and carbonate of the ocean is essentially bound $CO_2$, and the sum of these species along with gaseous $CO_2$, shown in equation 1, represents the total carbon dioxide concentration $[CO_2]_T$, of seawater.

$$\Sigma[CO_2]_T = [CO_2(g)]_1 + [HCO_3^-] + [CO_3^{2-}] \qquad (1)$$

At a typical ocean pH of 7.8, $[CO_2]_T$ is about 2000 μmoles/kg near the surface, and 2400 μmoles/kg at all depths below 300 meters. Takahashi et al., "The Alkalinity and Total Carbon Dioxide Concentration in the World Oceans," *Carbon Cycle Modell.*, Vol. 16; SCOPE: NY, USA, pp 271-286 (1981); Takahashi et al., "Carbonate Chemistry of the Surface of the Waters of the World Oceans," *Isotope Marine Chemistry*, Goldberg et al. eds., Uchida Rokakuho: Tokyo, Japan, pp 291-326 (1980). This equates to approximately 100 mg/L of $[CO_2]_T$ of which 2 to 3% is $[CO_2 (g)]$ (equation 1), 1% is carbonate, and the remainder is dissolved bicarbonate. Johnson et al. showed that when the pH of seawater is decreased to 6 or less, the total $CO_2$ exists only in the dissolved gas form. Johnson et al., "Coulometric $TCO_2$ Analyses for Marine Studies: An Introduction," *Marine Chem.*, 16, 61 (1985).

There are methods for carbon capture in a sea-based application. Hardy et al., "Extraction of Carbon Dioxide From Seawater by Ion Exchange Resin Part I: Using a Strong Acid Cation Exchange Resin" NRL Memorandum Report, 6180-07-9044 (20 Apr. 2007); Willauer et al., "Recovery of $[CO_2]_T$ from Aqueous Bicarbonate Using a Gas Permeable Membrane," NRL Memorandum Report, 6180-08-9129 (25 Jun. 2008); Willauer et al., "Recovery of $CO_2$ by Phase Transition from an Aqueous Bicarbonate System by Means of Multi-layer Gas Permeable Membranes," *Energy & Fuels* 23, 1770-1774 (2009); Willauer et al., "The Effects of Pressure on the Recovery of $CO_2$ by Phase Transition from a Seawater System by Means of Multi-layer Gas Permeable Membranes," intended for *Energy & Fuels* (2009); Willauer et al., "Extraction of $CO_2$ From Seawater By Ion Exchange Resin Part II: Using a Strong Base Anion Exchange Resins," NRL Memorandum Report (2013); Willauer et al., U.S. Provisional Application No. 61/084,700 "Recovery of $[CO_2]_T$ From Seawater/Aqueous Bicarbonate Using a Gas Permeable Membrane." Efficiency can be an issue with these methods.

An electrochemical method to acidify seawater and recover $[CO_2]_T$ simultaneously with hydrogen gas production from alkaline water sources including seawater has been developed at NRL. DiMascio et al., "An Electrochemical Method To Acidify Seawater and Recover $CO_2$ Simultaneously with Hydrogen Gas from Alkaline Water Sources Such as Seawater," U.S. Provisional Patent Application No. 61/333,553 filed May 11, 2010; DiMascio et al., "Extraction of Carbon Dioxide from Seawater by an Electrochemical Acidification Cell Part I: Initial Feasibility Studies" NRL Memorandum Report, 6180-10-9274 (23 Jul. 2010); Willauer et al., Willauer et al., "Extraction of Carbon Dioxide from Seawater by an Electrochemical Acidification Cell Part II: Laboratory Scaling Studies" NRL Memorandum Report, 6180-11-9329 (11 Apr. 2011); Willauer et al., "Development of an Electrochemical Acidification Cell for the Recovery of $CO_2$ and $H_2$ from Seawater," *Ind. Eng. Chem. Res.*, 9876-9822 (2011); Willauer et al., "Extraction of Carbon Dioxide from Seawater by an Electrochemical Acidification Cell Part III: Scaled-Up Mobile Unit Studies (Calendar Year-2011)" NRL Memorandum Report, 6300-12-9414 (30 May 2012).

BRIEF SUMMARY OF THE INVENTION

The present invention provides an electrochemical cell for the continuous acidification of alkaline water sources and recovery of carbon dioxide with continuous hydrogen gas production having a center compartment, an electrolyte-free anode compartment having a mesh anode in direct contact with an ion permeable membrane, an end block in direct contact with the mesh anode where the end block has channels for a gas escape route behind the mesh anode, an electrolyte-free cathode compartment having a mesh cathode in direct contact with an ion permeable membrane, an end block in direct contact with the mesh cathode where the end block has channels for a gas escape route behind the mesh cathode, and a mechanism to control the pressure differential between the center compartment and the electrodes. When alkaline water is passed through the electrochemical cell, current is applied to the cell for generating hydrogen gas in the cathode compartment. As this occurs, sodium ions transfer through the ion permeable membrane and are replaced by hydrogen ions from the anode compartment. The pH of the alkaline water is lowered and carbon dioxide is produced with no additional current or power applied. Also disclosed is the related method for continuously acidifying alkaline water sources and recovering carbon dioxide with continuous hydrogen gas production.

The present invention has several advantages over the prior art. It is a method that only requires electricity and does not require acidic or caustic materials in the recovery of carbon from seawater. The method eliminates the use of moderate conductive water and ion exchange media and relies solely on the ion exchange properties of the ion permeable membranes in the electrode compartments.

Electrolytic cells contain an electrolyte (usually acidic or caustic) in the electrode compartments and a conductive material in compartments in between, such as ion exchange resins. Ion exchange resins have chemical functional groups attached to a polymeric structure and can be consider an immobile electrolyte. The present invention does not use an electrolyte or ion exchange resin.

These and other features and advantages of the invention, as well as the invention itself, will become better understood by reference to the following detailed description, appended claims, and accompanying drawings.

DETAILED DESCRIPTION OF THE INVENTION

The present invention provides a revolutionary electrolytic module design that improves long term $CO_2$ process extraction efficiencies from alkaline water sources. The purpose of the present invention is to electrically extract all bicarbonate/carbonate system carbon from alkaline water sources such as seawater and simultaneously produce hydrogen gas.

Water of moderate conductivity and ion exchange resins, which have fixed ionic charges, are typically used as a conductive media in electrode compartments of electrolytic modules, particularly electrolytic modules containing at least one ion exchange membrane. These modules are typically configured but are not limited to electrodialysis applications.

The present invention provides a novel electrolytic module configuration that was developed to avoid the use of moderately conductive water and ion exchange resins, such as cation exchange resins. This new configuration relies on the ion exchange properties of the ion permeable membranes separating the electrode compartments. In the application of extracting carbon dioxide and hydrogen gas from alkaline water sources using an electrolytic module, the time to achieve an acidic pH after a polarity reversal and the electrical resistance (or power consumption) must be minimized. This reduction increases the long term process efficiency of $CO_2$ extraction from alkaline water sources.

A novel feature of the cell of the present invention is that the applied current to produce hydrogen gas ($H_2$) in the cathode compartment also concurrently makes use of hydrogen ions ($H^+$) produced in the anode compartment without an active mediator such as an electrolyte or ion exchange resin, which migrate into the center compartment causing the pH of the alkaline water to lower. This lowering of pH causes the conversion of carbonate and bicarbonate ions to carbon dioxide ($CO_2$). Because of this, no additional current or power is required to lower the pH of alkaline waters and produce $CO_2$.

$$2H_2O \rightarrow 4H^+ + O_2 + 4e^- \qquad \text{Anode:}$$

$$4|NaHCO_3|_{Seawater} + 4H^+ \rightarrow 4Na^+ + 4|H_2CO_3|_{Acidic\ Seawater} \qquad \text{Center:}$$

$$H_2CO_3 \leftrightarrow CO_2 + H_2O$$

$$4H_2O + 4Na^+ + 4e^- \rightarrow 4NaOH + 2H_2 \qquad \text{Cathode:}$$

$$2H_2O + 4NaHCO_3 \rightarrow |4CO_2|_{Center} + |4NaOH + 8H_2|_{Cathode} + |O_2|_{Anode} \qquad \text{Overall:}$$

Figure 1:
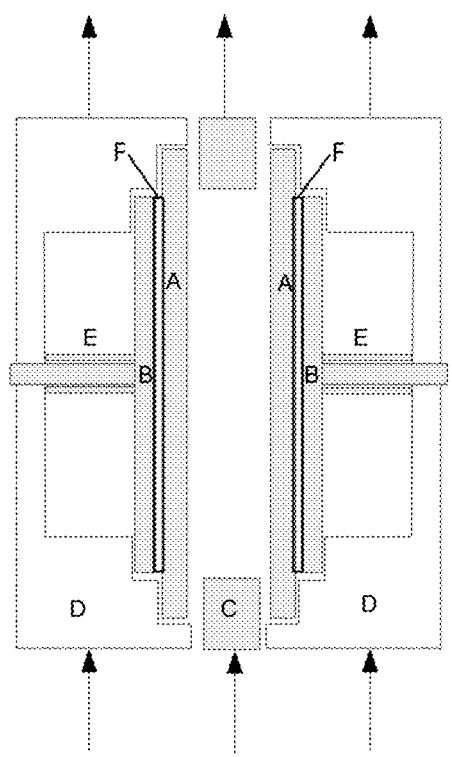
FIG. 1 is a schematic of the acidification module comprising (A) cation exchange membrane, (B) platinized titanium (mesh) electrodes, (C) center compartment with no inert media or distributors, (D) endblocks with no cation exchange resin or distributors, and (E) electrode stand-offs, and (F) screens between the cation exchange membranes and the electrodes.

FIG. 1 shows the conceptual design of the module with the least number of compartments. This concept positions an ion permeable membrane (in this case a cation-permeable membrane) flush against an expanded (mesh) electrode or flush against a thin screen that is flush against an expanded (mesh) electrode. Module designs of greater than three compartments are possible. The mesh electrodes are made of material that is capable of promoting both water reduction and water oxidation reactions. To allow for polarity reversal, the mesh electrodes have the same size dimensions and are made of the same material.

There is a space behind the electrode that will allow electrode gases to freely escape the compartment. This detail can be provided by the design of the endblock and/or the design of the electrode. The endblock is in direct contact with the mesh electrode, and the surface of the end block contains channels or troughs that allow hydrogen gas to be easily carried off by the flow liquid behind the mesh electrode. Removal of gas behind the electrode prevents gas blinding and the associated electrical resistance increase. It also preserves a uniform current distribution.

The center compartment can be empty or contain inert or ionically active media, allowing up to 100% of the compartment area to be conductive when filled with seawater. No media is preferred in the center compartment, as this will also avoid any type of plugging or fouling from impurities in the seawater. Alkaline water sources (e.g. seawater) have a high conductivity allowing the center compartment to be empty. The electrodes are positioned to be very close to the membranes, and a positive pressure difference between the center and electrode compartment during operation assures close contact. The membrane in contact with the anode acts as the only active mediator for protons produced at the anode to transfer through the membrane into the center compartment and replace the sodium ions in the alkaline water. The membrane in contact with the cathode acts as the only active mediator for the existing seawater cations in the center compartment (that have been displaced by the protons from the anode) to transfer from the center compartment to the cathode compartment. This process gives a low electrical resistance, for example less than or equal to 1 ohm, without the use of an acid or caustic electrolyte.

One of the main considerations in the hydraulic controls is to provide the ability to balance the pressure differential between the center and electrode compartments. Typically the center outlet pressure is maintained about 2 to 5 psi above the electrode outlet pressure, to prevent the possibility of cross-leaks from the center side to the electrode side. When no media is used in the center compartment, this pressure difference maintains the cation exchange membrane pressed against the electrode or screen. Improved flow dynamics and lower power requirement makes this configuration beneficial.

The cation-permeable membrane is a cross-linked polymer backbone with sulfonic acid groups attached to it. The acid functionality provides discrete channels for cations to migrate through the polymer matrix while blocking the passage of anions. In FIG. 1 seawater is passed through the center compartment C, of the three compartment cell. Sodium ions are transferred through the membrane closest to the cathode and removed from the seawater by means of direct (DC) voltage. These sodium ions are replaced by hydrogen ions as the current drives the ions through the membrane closest to the anode to acidify the seawater. The amount of $H^+$ generated in the process is proportional to the applied electrical current which follows Faraday's constant. Faraday's constant is defined as the amount of electricity associated with one mole of unit charge or electrons, having the value 96,487 ampere-second/equivalent. Thus the theoretical applied current required to lower the pH of seawater and the amount of hydrogen gas generated under those current conditions may be determined.

Figure 2:
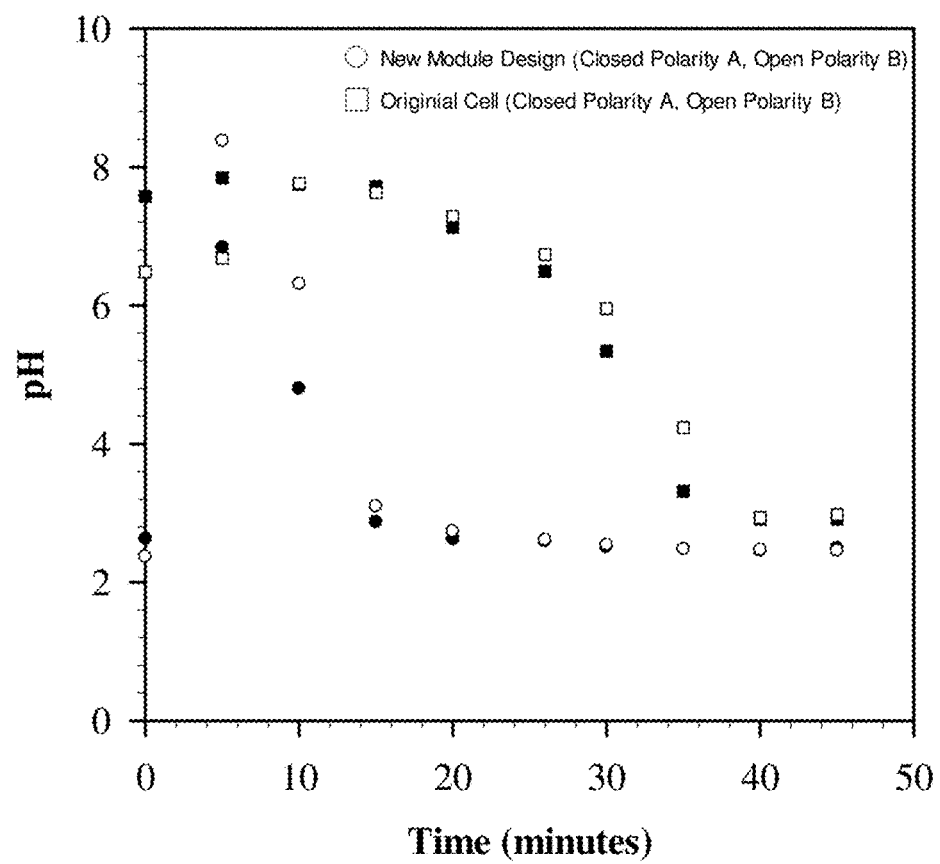
FIG. 2 shows a pH profile comparison of two consecutive 45 minute polarity cycles at 20 amps as a function of time for two different module configurations: New Module Concept (○), Original Module Concept (□).

FIG. 2 compares the results found when using Key West seawater in the original electrolytic module design with those obtained with the new module concept of the present invention. The pH of the seawater was between 8.2 and 8.6. Seawater was pumped through the center compartment at 1900 mL/min while water processed by a reverse osmosis system was pumped at 230 mL/min through the cathode and anode compartments. The pH profiles illustrate that both electrochemical modules reduce seawater pH below 6.0. The removal of ion exchange resin in the electrode compartments of the new module design of the present invention improved the electrolytic cell's acidification performance by reducing the effluent seawater equilibrium pH to 6 at a rate that increases production time of $CO_2$ by 67%. The pH of the seawater was reduced below 6.0 within 14 minutes using the design of the present invention, and more preferably within 10 minutes, versus the 30 minutes required by the previous design.

For one-pass in a typical continuous system, the residence time will vary as a function of operational flow rate and specific module dimensions and volume parameters.

In general, Ohms law is typically used to define a relationship between current and potential in an electrolytic module:

$$V=IR$$

where V is the potential (V), I current (A), and R the electrical resistance. R is the sum of all resistances between the electrodes, including resistances associated with cation exchange membrane, seawater, and (Reverse Osmosis) RO permeate. R follows the following relationship:

$$R=x/(A\kappa)$$

where x is the distance between the electrodes, A area of the electrodes or compartments, and $\kappa$ is the conductivity of the materials (membrane and solution) between the electrodes.

Power in watts (W) is defined as $$W=IV$$

To reduce W in a three compartment electrolytic cell and maintain a specific hydrogen production rate, R must be reduced. R can be reduced by decreasing the distance between the electrodes. Possible ways to do this include reducing the thickness of the electrode compartments and selecting a thinner, more conductive, and/or higher temperature compatible cation membrane. Another way that R can be reduced is to increase the area of the electrode. This may be done by increasing the compartment length and/or increasing the compartment width. R can also be reduced by increasing the conductivity of the materials between the electrodes. Some possible ways to accomplish this include decreasing the RO permeate flow rate in the anode compartment, using seawater in the cathode compartment, and increasing the temperature of all solutions.

There are several options to reduce power (W) including optimizing solution temperature, cell dimensions, and solution conductivity.

Solution Temperature

The highest seawater temperature that was measured in Key West was 96.5° F. The membranes can withstand temperatures up 113° F. Typically, electrolytic module resistance will change about 2% per 1 deg. C. The voltage (V) and therefore the power (W) can be reduced up to 20% by increasing the seawater temperature to 113° F. with the existing cation exchange membrane.

Cell Dimensions

The present module dimensions (length and width) can handle more flow, but more flow requires more current (I). Electrodes can be designed to withstand high current densities (I/A). High current densities will cause a large number of ions to migrate within the module. These ions will have to pass through membranes. For optimization, one needs to determine the maximum rate of ion passages through a membrane on an area basis or when the membrane becomes the limiting factor for ion migration.

Solution Conductivity

Using seawater in the cathode compartment will reduce the resistance of the module and lower the power consumption.

Presently at 25.7 kWhr/m³ $H_2$ production rate all carbonate and bicarbonate are re-equilibrated to $CO_2$ gas in the alkaline water. $H_2$ can be obtained at or below 4.3 kWhr/m³ $H_2$ production rate at STP, or the overall power consumption (W) for production of $H_2$ may be reduced (while still maintaining complete $CO_2$ production rate from alkaline water) by changing the following cell parameters: conductivity of the ion exchange membrane, the distance between the electrodes, and/or the electrode surface area (its length and width). These along with cell dimensions, influent liquid flow rates, and temperature are the parameters varied to minimize power consumption (W).

The above descriptions are those of the preferred embodiments of the invention. Various modifications and variations are possible in light of the above teachings without departing from the spirit and broader aspects of the invention. It is therefore to be understood that the claimed invention may be practiced otherwise than as specifically described. Any references to claim elements in the singular, for example, using the articles "a," "an," "the," or "said," is not to be construed as limiting the element to the singular.

What is claimed as new and desired to be protected by Letters Patent of the United States is:

1. A method for continuously acidifying alkaline water sources and recovering carbon dioxide with continuous hydrogen gas production, comprising:
    passing an alkaline water source comprising carbonate, bicarbonates, or both through an electrochemical cell comprising
        a center compartment in fluid communication with the alkaline water source;
        a first ion permeable membrane adjacent to the center compartment;

a mesh anode in direct contact with a screen that is in direct contact with the first ion permeable membrane, wherein the mesh anode allows for polarity reversal, and wherein the first ion permeable membrane is an active mediator for protons produced at the mesh anode to transfer into the center compartment in the absence of an electrolyte or an ion exchange resin in the anode compartment;

a first end block in direct contact with the mesh anode, wherein the first end block comprises channels for a gas escape route behind the mesh anode;

a second ion permeable membrane adjacent to the center compartment, wherein the first and second ion permeable membranes are on opposite sides of the center compartment;

a mesh cathode in direct contact with a screen that is in direct contact with the second ion permeable membrane, wherein the mesh cathode allows for polarity reversal, and wherein the second ion permeable membrane is an active mediator for cations in the center compartment that have been displaced by the protons from the anode to transfer into a cathode compartment in the absence of an electrolyte or an ion exchange resin in the cathode compartment; and a second end block in direct contact with the mesh cathode wherein the second end block comprises channels for a gas escape route behind the mesh cathode;

wherein when the alkaline water source is passed through the electrochemical cell, sodium ions transfer through the second ion permeable membrane and are replaced by hydrogen ions.

2. The method of claim 1, wherein each ion permeable membrane comprises a cross-linked polymer backbone with sulfonic acid groups attached thereto.

3. The method of claim 1, wherein the mesh anode and mesh cathode each comprise a material capable of promoting both water reduction and water oxidation reactions.

4. The method of claim 1, wherein the center compartment is empty.

5. The method of claim 1, wherein the center compartment contains material that allows up to 100% of the center compartment to be conductive when filled with alkaline water.

6. The method of claim 1, wherein the pH of the alkaline water source can be reduced to 6.0 or below.

7. The method of claim 1, wherein when current is applied to the electrochemical cell to generate hydrogen gas, this current produces the protons at the mesh anode that lower the pH of the alkaline water comprising carbonates, bicarbonates, or both to produce carbon dioxide with no additional current or power.

8. The method of claim 1, wherein the cell is optimized by changing the conductivity of at least one ion permeable membrane, the distance between the electrodes, the electrode surface area, or any combination thereof.

9. A method for continuously acidifying alkaline water sources and recovering carbon dioxide with continuous hydrogen gas production, comprising:

passing an alkaline water source comprising carbonate, bicarbonates, or both through an electrochemical cell comprising a center compartment in fluid communication with the alkaline water source;

a first ion permeable membrane adjacent to the center compartment;

an electrolyte-free anode compartment comprising a mesh anode in direct contact with a screen that is in direct contact with the first ion permeable membrane, wherein the mesh anode allows for polarity reversal;

a first end block in direct contact with the mesh anode, wherein the first end block comprises channels for a gas escape route behind the mesh anode;

a second ion permeable membrane adjacent to the center compartment, wherein the first and second ion permeable membranes are on opposite sides of the center compartment;

an electrolyte-free cathode compartment comprising a mesh cathode in direct contact with a screen that is in direct contact with the second ion permeable membrane, wherein the mesh cathode allows for polarity reversal;

a second end block in direct contact with the mesh cathode, wherein the second end block comprises channels for a gas escape route behind the mesh cathode; and means to control the pressure differential between the center compartment and both the anode and cathode compartments;

wherein when the alkaline water source is passed through the electrochemical cell, sodium ions transfer through the second ion permeable membrane and are replaced by hydrogen ions.

10. The method of claim 9, wherein each ion permeable membrane comprises a cross-linked polymer backbone with sulfonic acid groups attached thereto.

11. The method of claim 9, wherein the mesh anode and mesh cathode each comprise a material capable of promoting both water reduction and water oxidation reactions.

12. The method of claim 9, wherein the center compartment is empty.

13. The method of claim 9, wherein the center compartment contains material that allows up to 100% of the center compartment to be conductive when filled with alkaline water.

14. The method of claim 9, wherein a center compartment outlet pressure is maintained from 2 to 5 psi above an outlet pressure for both the anode and cathode compartments.

15. The method of claim 9, wherein the pH of the alkaline water source can be reduced to 6.0 or below.

16. The method of claim 9, wherein when current is applied to the electrochemical cell to generate hydrogen gas, this current produces the protons at the mesh anode that lower the pH of the alkaline water sources comprising carbonates, bicarbonates, or both to produce carbon dioxide with no additional current or power.

17. The method of claim 9, wherein the cell is optimized by changing the conductivity of at least one ion permeable membrane, the distance between the electrodes, the electrode surface area, or any combination thereof.

* * * * *